United States Patent [19]
Kondo et al.

[11] Patent Number: 5,253,124
[45] Date of Patent: Oct. 12, 1993

[54] APPARATUS FOR FORMING RECORDING TRACKS ON DISKS WITH DIFFERENT TRACK-NUMBER FORMATS

[75] Inventors: Tsuyoshi Kondo; Yasunori Maeshima; Takashi Fukushima, all of Tokyo, Japan

[73] Assignee: Sony Corporation, Tokyo, Japan

[21] Appl. No.: 648,878

[22] Filed: Jan. 31, 1991

[30] Foreign Application Priority Data

Jan. 31, 1990 [JP] Japan .................. 2-020958

[51] Int. Cl.$^5$ .............................. G11B 27/32
[52] U.S. Cl. ..................... 360/48; 360/72.2; 360/78.01; 360/135
[58] Field of Search ............... 360/48, 49, 72.2, 78.01, 360/78.04, 78.14, 135

[56] References Cited

U.S. PATENT DOCUMENTS 4,622,601 11/1986 Isozaki et al. ................ 360/48
4,939,598 7/1990 Kulakowski et al. .......... 360/48

FOREIGN PATENT DOCUMENTS 66085 4/1982 European Pat. Off. .
830220666 6/1985 Japan .

OTHER PUBLICATIONS

"Porting Files Between Computers Requires Attention To Formats", Computer Technology Review, vol. 6, No. 3, 1986, Los Angeles, U.S.A.

Primary Examiner—Joseph L. Dixon
Assistant Examiner—David L. Robertson
Attorney, Agent, or Firm—Lewis H. Eslinger; Jay H. Maioli

[57] ABSTRACT

A disk recording apparatus being compatible with disks whose storage capacity is different, in which a first and a second recording mode can be set. In the first recording mode, linear track numbers are assigned, and in the second recording mode, offsetting track numbers are assigned, so that some of the tracks in both formats have the same track numbers to provide compatibility.

8 Claims, 7 Drawing Sheets

Fig. 4

| 1 MB NR FORMAT | | 2 MB NR/HD FORMAT | | 2 MB HD FORMAT | |
|---|---|---|---|---|---|
| n : TRACK NO. | Rn:RADIUS OF TRACK (mm) | n : TRACK NO. | Rn:RADIUS OF TRACK (mm) | n': TRACK NO. | Rn':RADIUS OF TRACK (mm) |
| | | (−19) | 22.0 | (0) | 22.0 |
| | | (−18) | 21.9 | (1) | 21.9 |
| | | ---- | ---- | ---- | ---- |
| | | (0) | 20.1 | (19) | 20.1 |
| (1) | 20.0 | (1) | 20.0 | (20) | 20.0 |
| (2) | 19.9 | (2) | 19.9 | (21) | 19.9 |
| ---- | ---- | ---- | ---- | ---- | ---- |
| (n) | Rn=20−0.1(n−1) | (n) | Rn=20−0.1(n−1) | (n') | Rn'=20−0.1×n' |
| ---- | ---- | ---- | ---- | ---- | ---- |
| (50) | 15.1 | (50) | 15.1 | (69) | 15.1 |
| | | ---- | ---- | ---- | ---- |
| | | (69) | 13.2 | (88) | 13.2 |
| | | (70) | 13.1 | (89) | 13.1 |

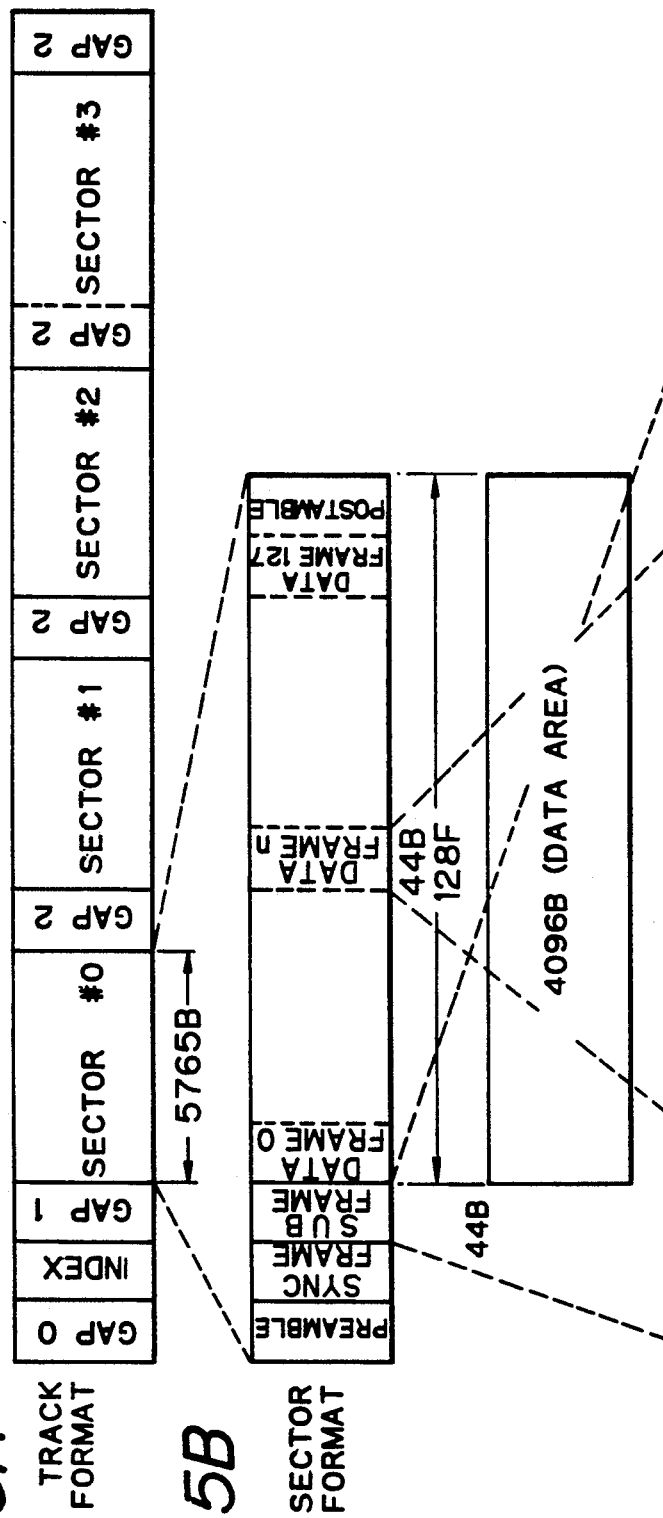

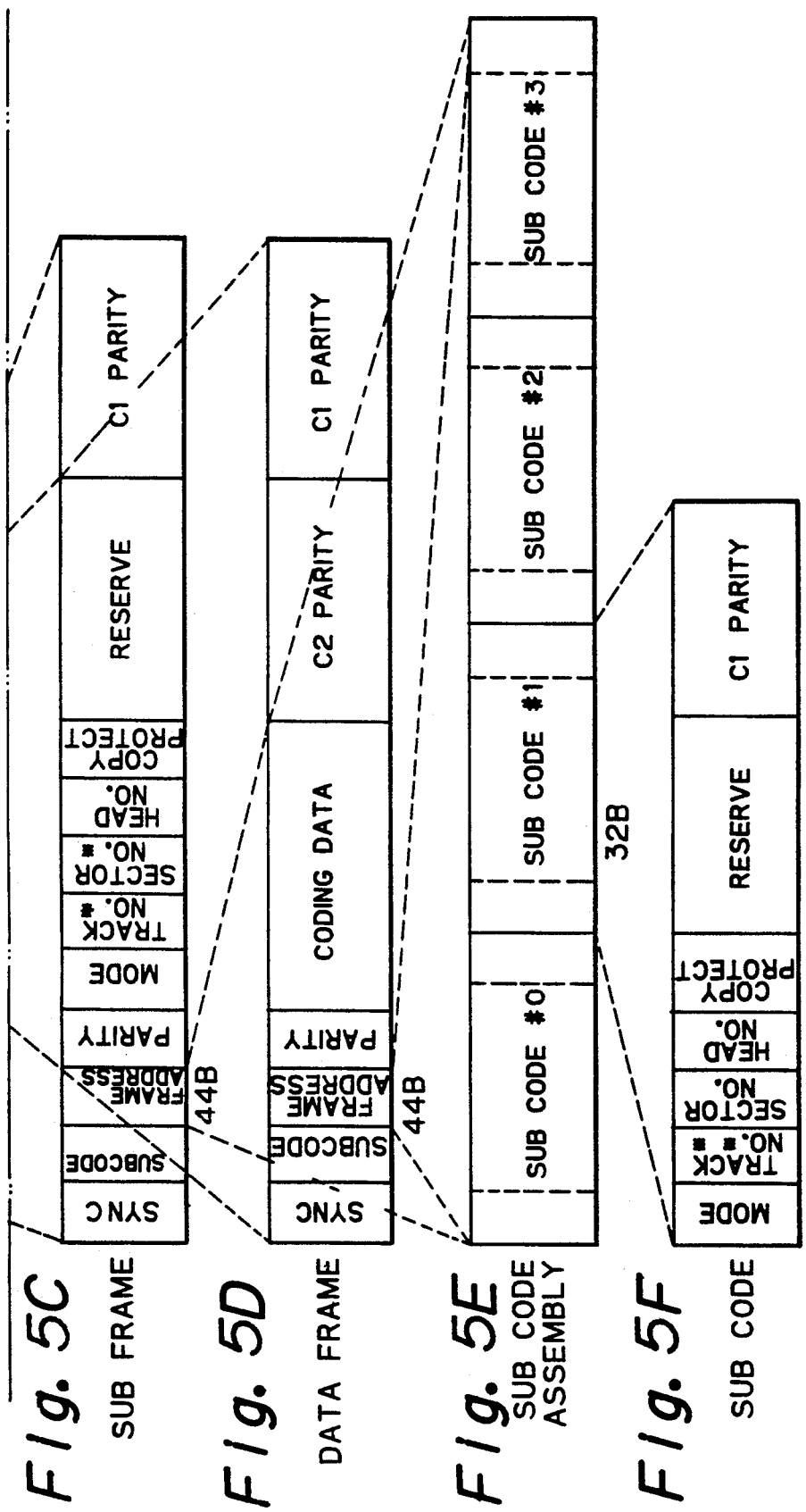

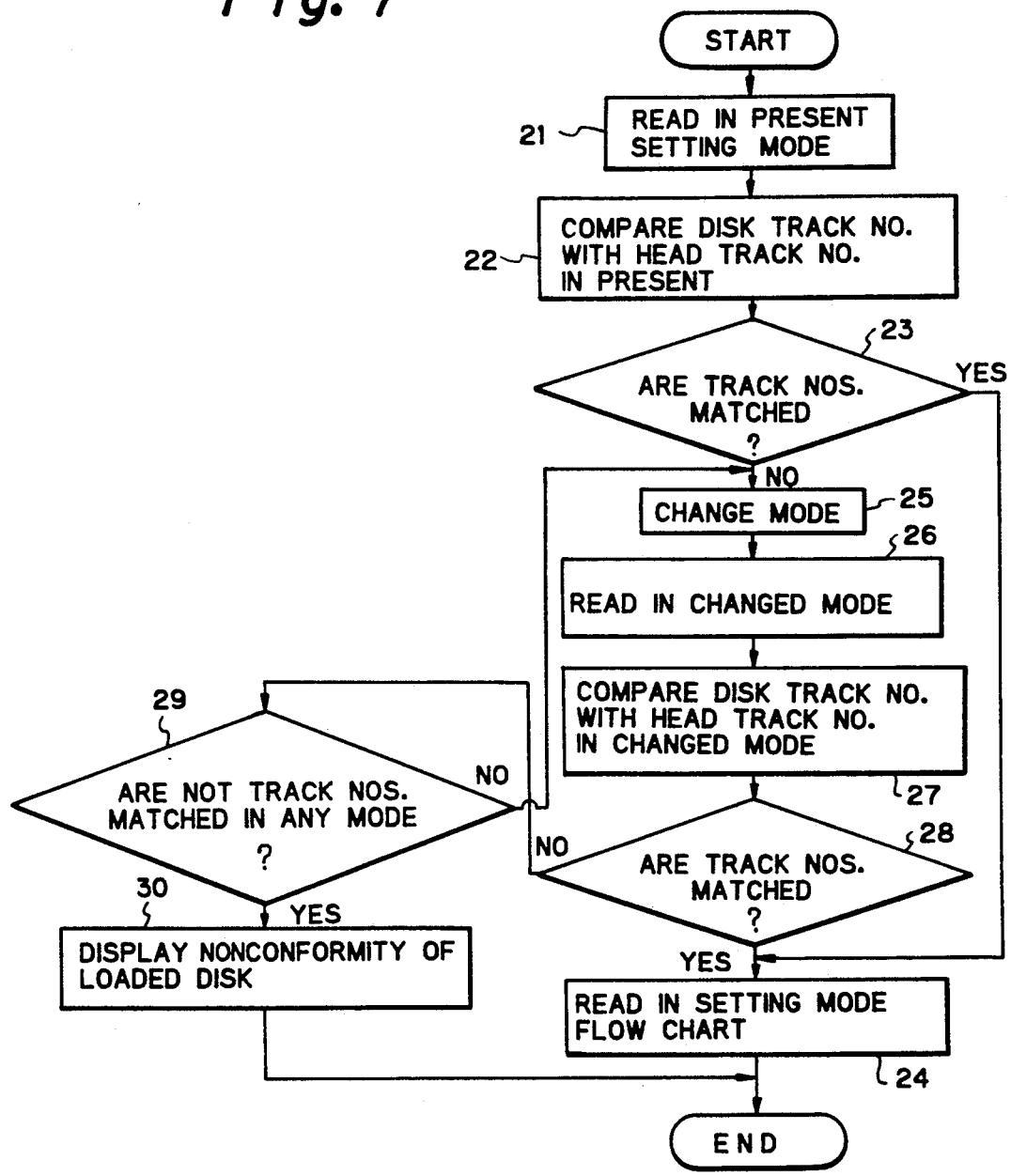

APPARATUS FOR FORMING RECORDING TRACKS ON DISKS WITH DIFFERENT TRACK-NUMBER FORMATS

BACKGROUND OF THE INVENTION

1. Field of the Invention

The present invention relates to a magnetic disk recording apparatus and, more particularly, to a magnetic disk recording apparatus that is compatible with disks whose storage capacities are respectively different.

2. Description of the Background

A data recording/reproducing apparatus for recording and reproducing digital data corresponding to a still picture to/from a magnetic disk having an outer diameter of around 2 inches has been known for some time. In addition, handy character processing apparatus using such a magnetic disk has been widely used.

Conventionally, such a magnetic disk has fifty circular tracks with a track pitch of 0.1 mm. The track numbers are inwardly assigned starting from outer track number 1 to inner track number 50, and the storage capacity per track is around 16 kilobytes. Thus, one disk can record data of around 819 kilobytes (16,384 bytes×50 tracks=819,200). In addition to the storage area for real data a disk usually has additional storage area for recording other information, such as preamble data, sync data, error correction data, ID data, and so on. This brings the storage capacity of a disk to around 1 mega-bytes. For this reason, the conventional magnetic disk having fifty tracks is hereinafter referred to as the 1M byte disk.

On the other hand, magnetic disks have been proposed where the number of tracks is increased in order to increase the storage capacity. For example, it has been proposed to add twenty tracks on both the outer and inner peripheries of the conventional fifty-track magnetic disk. Because the forty new tracks are added to the previously available fifty tracks, there is a total of ninety tracks. When there are ninety tracks, data of around 1.47 mega-bytes (16,384 bytes×90 tracks) can be recorded per disk. The disk having ninety tracks is hereinafter referred to as the 2M byte disk.

Specialized magnetic disk drive apparatus that can deal with the 2M byte disk has been developed, however, it is desirable that the same disk drive apparatus that deals with the new 2M byte disks should also be compatible with the conventional 1M byte disks. In other words, the magnetic disk drive apparatus that deals with the 2M byte disks should be capable of recording and reproducing data to/from the conventional 1M byte disks.

OBJECTS AND SUMMARY OF THE INVENTION

Therefore, it is an object of the present invention to provide a magnetic disk recording apparatus that has compatibility between the 1M byte disks and the 2M byte disks.

According to an aspect of the present invention, there is provided a disk recording apparatus for compatibly recording/reproducing on a first disk having a normal amount of track numbers and on a second disk having a higher amount of track numbers, wherein a first recording mode assigns successively, in a linear fashion, first track numbers from one edge of the disk to the other edge in the radial direction to a respective plurality of tracks to be recorded, and in a second recording mode assigns second track numbers, including the first linear track numbers with an offset, to a larger plurality of tracks to be recorded than in the first mode.

When the disk having the larger number of tracks is initialized, one of the two formats, which consist of the 2M byte NR/HD compatible format and the 2M byte HD format, can be selected. In the 2M byte NR/HD compatible format, track numbers one to fifty are assigned to the tracks that are located at the same positions as those in the 1M byte disk. Track numbers (−19) to (0) are assigned to the outer peripheral tracks, while track numbers (51) to (70) are assigned to the inner peripheral tracks. In the 2M byte HD format, track numbers (0) to (89) are linearly or consecutively assigned to the ninety tracks.

BRIEF DESCRIPTION OF THE DRAWINGS

FIG. 4 is a table of the compatible track formats according to an embodiment of the present invention;

FIGS. 5A–5F are representations of the recording format of the magnetic disk according to an embodiment of the present invention;

FIG. 7 is a flow chart describing the operation of the embodiment of FIG. 6.

DETAILED DESCRIPTION OF THE PREFERRED EMBODIMENTS

Figure 1A:
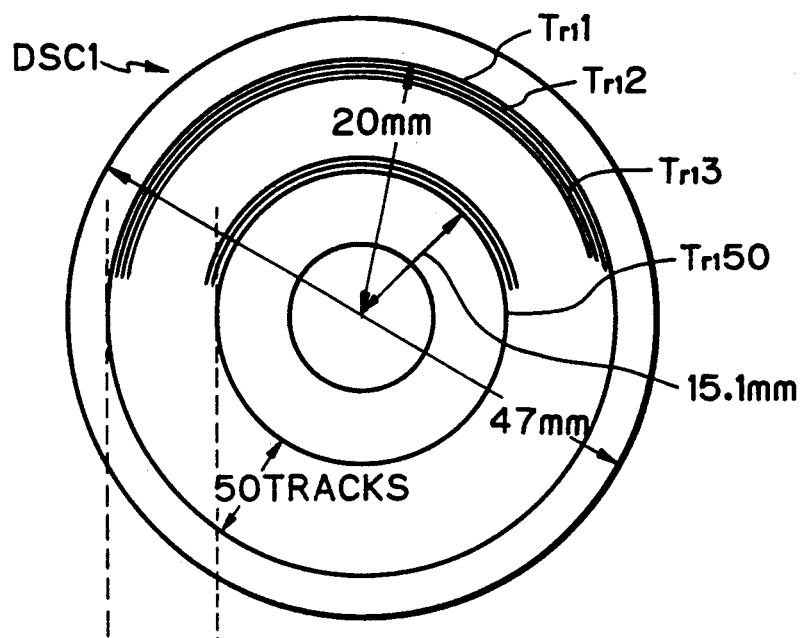
FIGS. 1A and 1B are plan views of a magnetic disk having a first number of tracks and of another magnetic disk having a second, larger number of tracks, respectively.

In FIG. 1A the structure of the 1M byte disk DSC1 is shown in which the outer diameter of disk DSC1 is approximately 47 mm. on the 1M byte disk DSC1, fifty tracks, $T_{r1}1$ to $T_{r1}50$, are disposed at respective pitches of 0.1 mm. Track $T_{r1}1$ is positioned at a radius of 20 mm and track $T_{r1}50$ is positioned at a radius of 15.1 mm. The 1M byte disk DSC1 has a data storage capacity of 819 kilobytes. Track numbers (1) to (50) are assigned to tracks $T_{r1}1$ to $T_{r1}50$, respectively. The format in which such track numbers are assigned on the 1M byte disk is hereinafter referred to as the 1M byte Normal format or the 1M byte NR format.

Figure 1B:
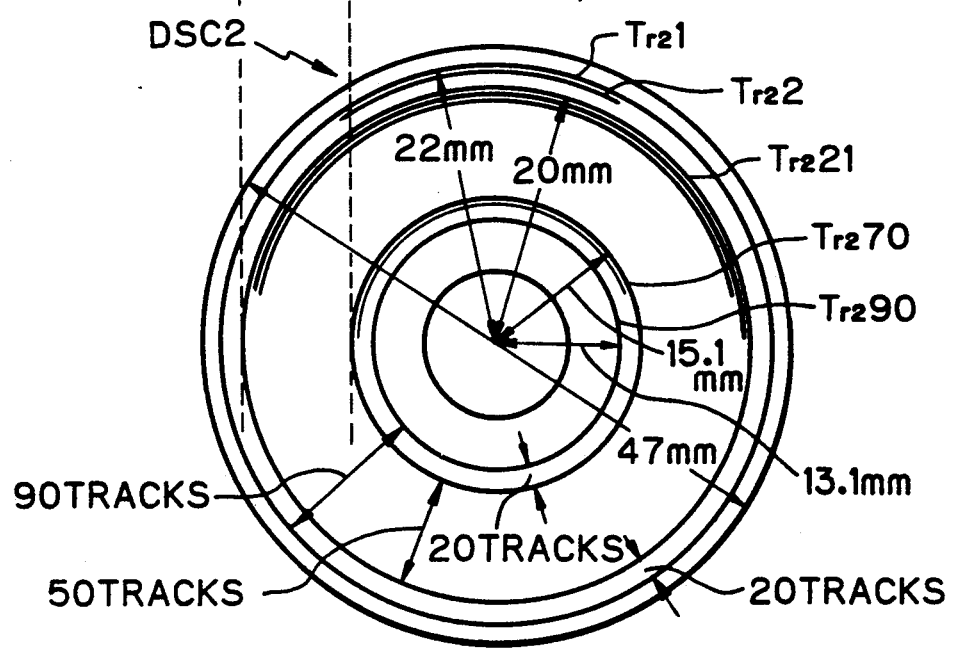

In FIG. 1B the structure of a 2M byte disk DSC2 is shown in which the outer diameter is again approximately 47 mm, which is the same as the 1M byte disk DSC1. On the 2M byte disk DSC2, there are twenty new tracks added at both the outer and inner peripheries of the 1M byte disk DSC1. As shown in FIG. 1B, on the 2M byte disk DSC2 ninety tracks, $T_{r2}1$ to $T_{r2}90$, are disposed at respective pitches of 0.1 mm. The outermost peripheral track $T_{r2}1$ is positioned at a radius of 22 mm and the innermost peripheral track $T_{r2}90$ is positioned at a radius of 13.1 min. The 21st track, $T_{r2}21$, to the 70th track, $T_{r2}70$, as counted from the outermost periphery, are disposed at positions in accordance with track $T_{r1}1$ to track $T_{r1}50$ on the 1M byte disk DSC1. In other words, track $T_{r2}21$ is positioned at a radius of 20 mm, and track $T_{r2}70$ is positioned at a radius of 15.1 mm.

Figure 2:
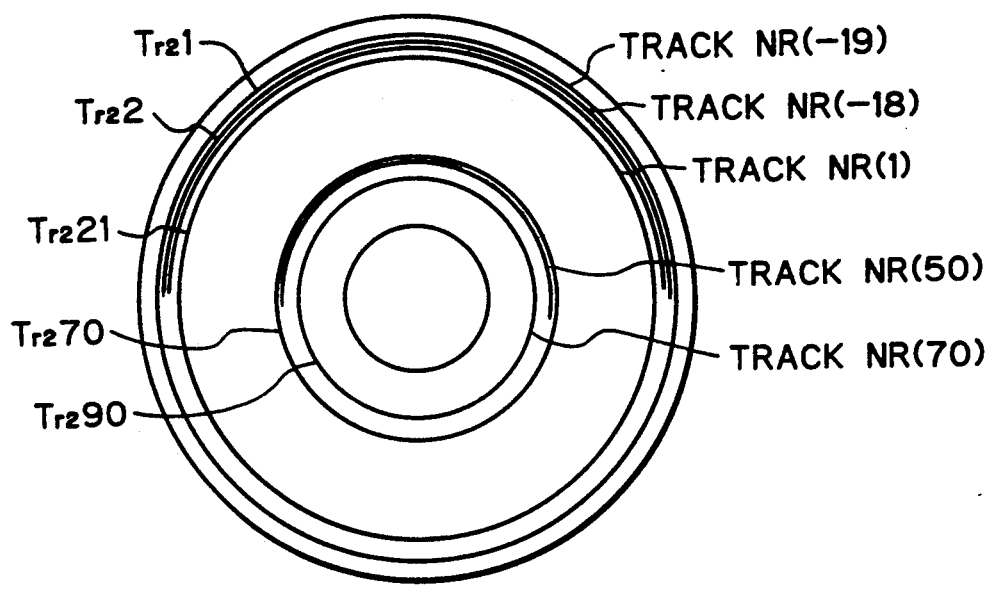
FIG. 2 is a plan view of the magnetic disk of FIG. 1B showing a first track numbering format.

The 2M byte disk DSC2 can be assigned track numbers in two formats. In one format, track numbers are assigned with an offset in order to provide compatibility with the 1M byte NR format described in regard to FIG. 1A. This format is referred to as the 2M byte NR/HD compatible format and, as shown in FIG. 2, tracks $T_{r2}21$ to $T_{r2}70$ are assigned track numbers (1) to (50), respectively. The outer track $T_{r2}1$ to track $T_{r2}0$ are assigned track numbers (−19) to (0), respectively, and the inner track $T_{r2}71$ to track $T_{r2}90$ are assigned track numbers (51) to (70), respectively. When the track numbers are assigned in the aforementioned manner, because track $T_{r2}21$ to track $T_{r2}70$ are in agreement with track $T_{r1}1$ to track $T_{r1}50$ on the 1M byte disk DSC1, and thus have the same track numbers (1) to (50), the compatibility between the two disks can be readily accomplished.

Figure 3:
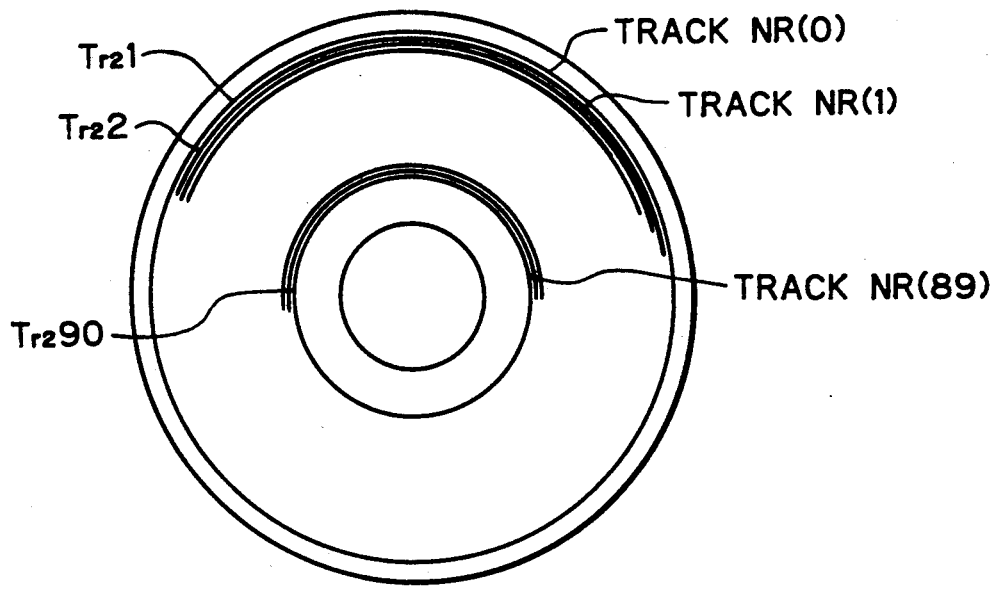
FIG. 3 is a plan view of the magnetic disk of FIG. 1B showing a second track numbering format.

In the other of the two formats, consecutive track numbers are linearly assigned to the ninety available tracks. This format is hereinafter referred to as the 2M byte HD (High Density) format. In this format, as shown in FIG. 3, tracks $T_{r2}1$ to $T_{r2}90$ are assigned continuous track numbers (0) to (89), respectively. When such linear track numbers are assigned, it is preferable to deal with data that continues over among a number of tracks. Such continuous data is represented by audio data or still pictures for animation or games, which necessarily require a large number of tracks. By recording such information continuously on adjacent tracks access to the data can be had quickly and a buffer memory is not required.

FIG. 4 shows the relationship among the 1M byte NR format, the 2M byte NR/HD compatible format, and the 2M byte HD format. As shown in FIG. 4, when the 2M byte disk DSC2 is initialized in the 2M byte NR/HD compatible format certain ones of the track numbers thereof become the same as those of the 1M byte disk, which is initialized in the 1M byte NR format. The area surrounded by a heavy line in FIG. 4 shows the compatible area. Thus, the disk recording/reproducing apparatus for the 2M byte NR format can record and reproduce data to/from the 1M byte disk DSC1. In other words, by using the 2M byte NR/HD compatible format, upper compatibility can be fully accomplished. This means that if a user has a recording/reproducing apparatus capable of handling the 2M byte HD format, which may be an expensive machine, he can record/reproduce data either in the 2M-NR/HD format or the 2M-HD format using his machine. In addition, data recorded in the 2M-NR/HD format using such apparatus can also be reproduced on a machine capable only of the 1M-NR format, which machine may be relatively inexpensive. On the other hand, this compatibility does not flow the other way. Thus, the high-end machine can cover all of the functions of the lesser machine but not vice-versa.

As shown in FIGS. 5A to 5F, each track number is recorded in both the track number area of the sub frame and in the track number area of the sub code.

FIG. 5A shows the arrangement of one track, which is provided with four sectors. As shown in FIG. 5B, data is recorded in each sector, and the storage capacity of the data record area of each sector is 4096 bytes. As shown in FIG. 5C, the track number is recorded in the sub frame of each sector, as is the frame address. The frame address is also recorded in the data frame of each sector, as shown in FIG. 5D.

As shown in FIG. 5E, the 44 bits of the frame address is divided into four sub code areas. As shown in FIG. 5F, in the sub codes #0 to #3 of the frame address, the track number  is also recorded. The track number  recorded in the sub code of the frame address is the same as the track number * recorded in the sub frame. Thus, the reliability of reading the track numbers is provided. In one track, the track number ** is recorded four times, in each of the sub codes #0 to #3, and the track number * is recorded one time in the sub frame. Thus, the same track number is recorded five separate times, and because one track is divided into four sectors, in one track the track number is recorded 20 times (5 times ×4 sectors).

Figure 6:
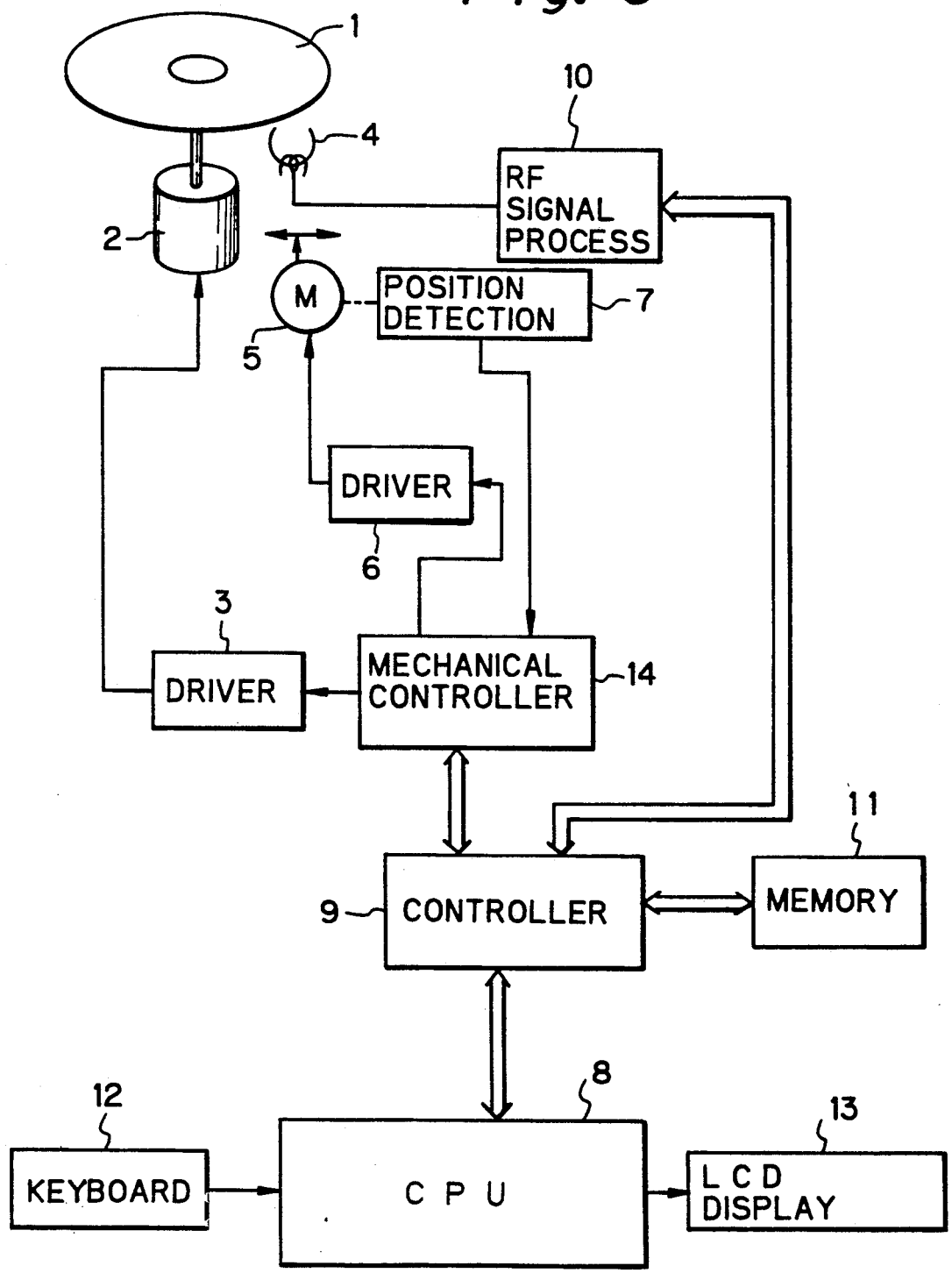
FIG. 6 is a schematic in block diagram form of a magnetic disk recording/reproducing apparatus according to an embodiment of the present invention.

FIG. 6 shows an embodiment of a disk recording/reproducing apparatus according to the present invention, in which a magnetic disk 1 employed thereby can be either the aforementioned 1M byte disk DSC1 or the 2M byte disk DSC2. Magnetic disk 1 is rotated by a spindle motor 2 that receives a rotation drive signal supplied from a mechanical controller 14 through a driver 3.

A magnetic head 4 is moved radially on magnetic disk 1 by means of a head moving motor 5 that receives a drive signal supplied from mechanical controller 14 through a driver 6. The physical position of the magnetic head 4 is detected by a position detector 7 whose output is supplied to mechanical controller 14. By means of the output of position detector 7, the track number accessed by magnetic head 4 can be detected.

Data from a central processing unit CPU 8 is supplied to magnetic head 4 through a controller 9 and an RF signal processing circuit 10 and is recorded on magnetic disk 1. The signal reproduced from magnetic disk 1 is supplied to CPU 8 through RF signal processing circuit 10 and controller 9.

CPU 8 is bidirectionally connected to mechanical controller 14 through controller 9, and CPU 8 and a memory 11 are bidirectionally connected to controller 9. A keyboard 12 operating as an input unit and a liquid crystal display 13 operating as an output unit are connected to CPU 8.

Before using the magnetic disk recording/reproducing apparatus shown in FIG. 6 and described above, the magnetic disk 1 being loaded is initialized. When the 2M byte disk DSC2 has been loaded, and before the disk is initialized, one of the two formats, which are the 2M byte NR/HD compatible byte VF format and 2M byte HD format, can be selected using keyboard 12.

When the 2M byte NR/HD compatible format mode is designated by the operation of keyboard 12, track numbers with an offset are assigned to the tracks thereon so as to provide the necessary compatibility. On the other hand, when the 2M byte HD format is designated, linear track numbers are assigned to the tracks thereon.

In this magnetic disk recording/reproducing apparatus, when one of the 1M byte disks in the 1M byte NR format, one of the 2M byte disks in the 2M byte NR/HD compatible format, or one of the 2M byte disks in the 2M byte HD format is loaded as the magnetic disk 1 for reproduction, the process shown by the flow chart of FIG. 7 is executed, whereby the format of the magnetic disk 1 is determined.

In other words and referring to FIG. 7, in the mode currently being set, the track number of the magnetic disk 1 being loaded is detected by position detector 7 in step 21. Thereafter, the track number accessed by the magnetic head 4 in the mode being set is compared with the track number corresponding to the actual location of the magnetic head 4 in step 22.

It is then determined in step 23 whether the track number being accessed by the magnetic head 4 in the mode being set agrees with the track number being read. When the track number being accessed by the magnetic head 4 in the mode being set agrees with the track number being read, it is determined that the mode currently being set is in accordance with the format of the magnetic disk being loaded. Thereby, the magnetic disk 1 is recorded/reproduced in the presently set mode in step 24.

When the track number being accessed as detected by the position detector 7 in the mode being set does not agree with the track number actually being read by the head in step 23, the mode is changed in step 25. For example, if the mode has been set to the 1M byte NR format, the mode will be changed to the 2M byte NR/HD compatible format. On the other hand, if the mode had been set to the 2M byte NR/HD compatible format, the mode will be changed to the 2M byte HD format. Moreover, if the mode had been set to the 2M byte HD format, the mode will be changed to the 2M byte NR format.

Thereafter, in the changed mode, the track number of the magnetic disk 1 being loaded is read in step 26, and the track number accessed by the magnetic head 4 in the changed mode is compared with the track number being read in step 27.

In step 28 it is determined whether the track number accessed by the magnetic head 4 in the changed mode agrees with the track number being read. When the track number being accessed by the magnetic head 4 in the mode being set agrees with the track number being read, the procedure advances to step 24. In step 24, the magnetic disk 1 is recorded or reproduced in the presently set mode.

When the track number being accessed by the magnetic head 4 in the mode as set does not agree with the track number being read, the procedure returns to the step 25 where the mode is changed and the procedure continues until it is determined whether the mode has been changed to all possible modes in step 29.

When the track number being accessed by magnetic head 4 does not agrees with the track number being read, even after the mode has been changed to all available modes, a message representing that the loaded disk cannot be used is displayed in step 30.

According to the present invention, when the 2M byte disk is initialized, one of two formats, either the 2M byte NR/HD compatible format or the 2M byte HD format, can be selected. In the 2M byte NR/HD compatible format, the same track numbers (1) to (50) are assigned to the tracks that are located at the corresponding positions on the 1M byte disk and to the outer peripheral tracks track numbers (−19) to (0) are assigned and to the inner peripheral tracks track numbers (51) to (70) are assigned. Thus, the compatibility with the 1M byte disk can be readily accomplished. On the other hand, in the 2M byte HD format, linear track numbers (0) to (89) are consecutively assigned to the ninety available tracks. Thus, continuous data can be readily processed.

The above description is given on a single preferred embodiment of the invention, but it will be apparent that many modifications and variations could be effected by one skilled in the art without departing from the spirit or scope of the novel concepts of the invention, which should be determined by the appended claims.

What is claimed is:

1. A disk recording apparatus for compatibly recording/reproducing information to/from a disk recording medium having a first number of tracks and a disk recording medium having a second, higher number of tracks, comprising:

first recording mode means for forming a first plurality of recording tracks and assigning first track numbers consecutively from one peripheral edge of a disk recording medium to the other peripheral edge of the disk in the radial direction in succession to said first plurality of tracks to be recorded on the disk recording medium, and second recording mode means for forming a second plurality of recording tracks of a second recording mode on an outer peripheral area in the radial direction of the disk recording medium at an area beyond the first plurality of recording tracks formed by said first recording mode means and assigning second track number including said first track numbers and having an offset to said second plurality of tracks greater than said first plurality of tracks.

2. A disk recording apparatus according to claim 1, wherein said second recording mode means further forms recording tracks of said second recording mode on an inner peripheral area in the radial direction inside of the recording tracks formed by said first recording mode means.

3. A disk recording apparatus according to claim 1, wherein said first recording mode means assigns track numbers increasing from address number 0, and said second recording mode means assigns minus sign track numbers decreasing from address number 0 to tracks formed in a selected part of the disk recording medium, said minus sign numbers forming said offset.

4. A disk format for a disk recording apparatus that records/reproduces disks having first normal-density track numbers and disk having second high-density track numbers compatibly, wherein a first recording mode for forming a first plurality of recording tracks and assigning linear first type track numbers from one end of the disk to the other end of the disk in a radial direction in turn to said first plurality of tracks to be recorded on the disk type recording medium, and a second recording mode for forming a second plurality of recording tracks on at least on an outer peripheral area in the radial direction of the disk beyond recording tracks of said first recording mode and assigning a second type track numbers including said linear track numbers with an offset to said second plurality of tracks greater than said first plurality of tracks.

5. A disk format according to claim 4, wherein recording tracks of said second recording mode are further formed on an inner peripheral area in the radial direction inside of the recording tracks of said first recording mode.

6. A disk format according to claim 4, wherein in said first recording mode, track numbers increasing from address number 0 are assigned, and in said second recording mode, the minus sign track numbers decreasing from address number 0 are formed in a selected part of the disk.

7. A disk reproducing apparatus for use with a first format recording disk having linear track numbers assigned to tracks and a second format recording disk having track numbers assigned with an offset to have compatibility with the tracks, comprising:

a reproducing head for picking up recorded information from said recording disk;

track signal reproducing means for reproducing track numbers from a reproduced signal from said reproducing head, position sensing means for sensing an access position of said reproducing head and outputting track numbers corresponding thereto; and recording format determining means for determining a recording format of said recording disk by comparing track numbers obtained by said position sensing means with track numbers obtained by said reproducing means.

8. A disk reproducing apparatus according to claim 7, further comprising display means for displaying the determined result of said recording format determining means.

* * * * *

UNITED STATES PATENT AND TRADEMARK OFFICE
CERTIFICATE OF CORRECTION

PATENT NO. : 5,253,124
DATED : October 12, 1993
INVENTOR(S) : Tsuyoshi Kondo, Yasunori Maeshima and Takashi Fukushima It is certified that error appears in the above-indentified patent and that said Letters Patent is hereby corrected as shown below:

```
Col. 1, line 23, change "kilobytes" to --kilo-bytes--
        line 24, change "kilobytes" to --kilo-bytes--
Col. 2, line 42, change "on" to --On--
        line 43, change "50" to --50--
        line 47, change "kilobytes" to --kilo-bytes--
        line 62, change "min." to --mm.--

Col. 6, line 23, change "number" to --numbers--
```

Signed and Sealed this

Eleventh Day of July, 1995

Attest:

BRUCE LEHMAN

*Attesting Officer*  *Commissioner of Patents and Trademarks*